April 14, 1953        R. L. SMITH        2,635,082
PROCESS FOR ACTIVATING CHROMIA-ALUMINA CATALYST
Filed Jan. 28, 1952
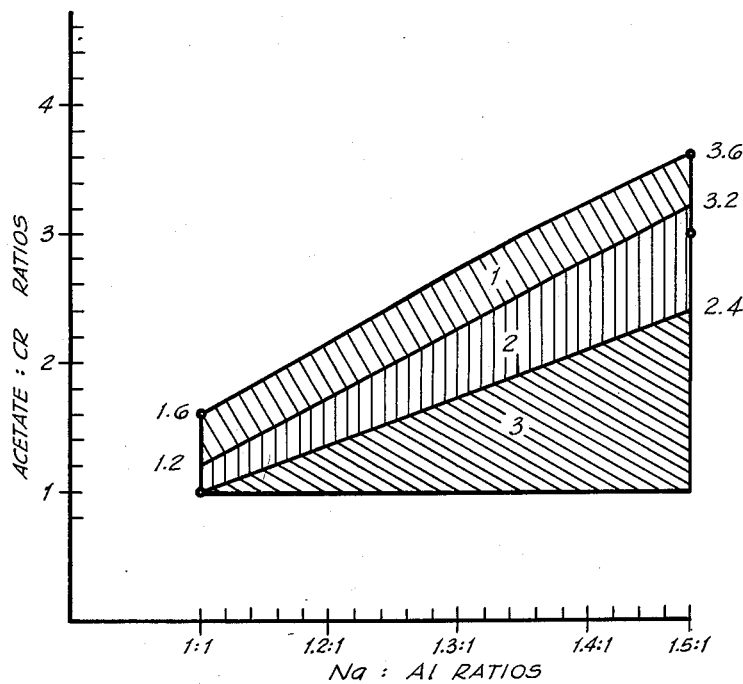
INVENTOR.
ROBERT L. SMITH
BY Raymond W. Barclay
ATTORNEY Patented Apr. 14, 1953

2,635,082

UNITED STATES PATENT OFFICE 2,635,082

PROCESS FOR ACTIVATING CHROMIA-ALUMINA CATALYST

Robert L. Smith, Pitman, N. J., assignor to Socony-Vacuum Oil Company, Incorporated, a corporation of New York Application January 28, 1952, Serial No. 268,505

7 Claims. (Cl. 252—465)

This invention relates to an improved process for preparing a chromia-alumina cogelled catalyst useful in promoting dehydrogenation and aromatization of petroleum hydrocarbons. More particularly, the present invention is directed to a method for activating chromia-alumina hydrogel during the process of preparation to yield a resultant cogelled catalyst exhibiting improved reforming activity and decreased coke formation.

In copending application Serial Number 201,537, filed December 14, 1950, by Stover and Wilson, there is described, among other things, a process for preparing a cogelled catalytic composite of chromia and alumina having an inorganic oxide content of at least about 10 per cent by weight. Such process has been set forth in detail in the aforementioned patent. For convenience herein, however, the following is offered as a brief description of said process.

A true, all-embracing chromia-alumina hydrogel having a metal oxide product concentration of at least about 10 per cent by weight and a relatively short gelation time, i. e., less than 2 hours and preferably less than 60 seconds, is prepared by intimately admixing an organic chromium salt, such as chromic acetate, and an alkali metal aluminate, such as sodium aluminate, to produce a chromia-alumina hydrosol. The hydrosol so formed is permitted to set to a hydrogel. The resulting hydrogel is thereafter subjected to aging and then water-washed, dried, and calcined to yield a catalytic chromia-alumina gel composite. The relative proportions of chromia and alumina may be varied over a wide range. The chromia content of such composites will generally be in the range of 10 to 40 mole per cent of $Cr_2O_3$ and the alumina content in the range of 60 to 90 mole per cent of $Al_2O_3$.

It is preferred to use aqueous solutions of sodium aluminate and chromium acetate for preparation of the above-described hydrogels. Neither of these substances is a true chemical compound. The ratio of sodium to aluminum can be varied widely, as can the ratio of acetate to chromium ion. Variation in the sodium to aluminum ratio of the aluminate solution requires compensating adjustment of the acetate to chromium ratio of the second solution in order to achieve satisfactory gelation. The drawing annexed hereto presents data graphically illustrating relationships between acetate to chromium ratios and sodium to aluminum ratios which yield hydrosols capable of setting to hydrogels in less than about 20 seconds. Such hydrosols of short gelation time are particularly desirable for the production of bead-like spheroidal particles by methods well known in the art, for example, those described in patents to Marisic, such as U. S. Patent 2,384,946.

Referring more particularly to the graph, the area designated as "1" includes relationships involving quick-setting hydrosols of low viscosity which can be readily handled at bead-forming nozzles. The area designated as "2" includes relationships yielding slow-setting hydrosols. These hydrosols may be handled in bead-forming equipment by application of heat to increase the velocity of the gelation process. The area designated as "3" includes hydrosols of very long gelation time. Some of the hydrosols included in this area have gelation times of from 12 to 24 hours and consequently are unsatisfactory for bead formation.

The relationships shown graphically in the drawing are readily reduced to mathematical expression. All of the sodium aluminate solutions have a sodium to aluminum mole ratio, designated hereinafter as "R," between 1 and 1.5. The preferred area 1 is further defined in stating that the acetate to chromium mole ratio is not less than $4R-2.8$ and not more than $4R-2.4$. The operative range of values, including areas 1 and 2, involves the same maximum of $4R-2.4$ but the minimum is $2.8R-1.8$.

The control of the mole ratios discussed above is readily achieved in the manufacture of the reactant solutions. Chromium acetate is readily formed without introduction of undesirable extraneous materials by reducing sodium dichromate with glycolic acid in the presence of acetic acid. Sodium dichromate, water, and acetic acid are mixed and heated at atmospheric pressure. After heating to 170–220° F., the glycolic acid is gradually added. Thereafter, the mixture is digested at 210–220° F. until evolution of carbon dioxide therefrom has ceased. The proportions of reactants used may be varied within wide limits to form the chromium acetate complex at desired mole ratios.

Sodium aluminate of satisfactory quality has been prepared from caustic soda of 50° Bé. and aluminum trihydrate. At a sodium to aluminum mole ratio in the range of 1.25/1 to 1.5/1, the sodium aluminate is advantageously manufactured in an open, agitated kettle at 220–230° F. with a reaction time of 1 to 3 hours. Solutions having a lower mole ratio down to about 1.0/1 are made in an autoclave at 240 to 300° F. and 10 to 30 pounds per square inch gauge at the same reaction time. Sodium aluminate solutions having a low sodium to aluminate ratio less than 1.3 are relatively unstable and may be stabilized by the addition of such organic materials as glycerin, starch, sugar, and the like.

Thus, chromia-alumina hydrogels having a short time of set and a high solids content generally between about 10 and about 30 per cent by weight may readily be prepared by controlling the sodium to aluminum mole ratio of the sodium aluminate solution employed and the acetate to chromium mole ratio of the chromium acetate solution. The specific ratios employed will depend upon the particular composition of the chromia-alumina hydrogel desired.

Temperature, acidity, and product concentration are interrelated variables effecting gelation and within the limits in which formation of hydrogels occurs, they control gelation time. In general, the other factors can be controlled to achieve gelation at any practicable solution temperature. Thus, temperatures from 30° F. to 130° F. have been used. Best gelation times have been experienced at temperatures between about 120 and about 140° F. The pH of the chromia-alumina hydrogels is generally between 10 and 13. For bead formation, a pH value of about 12 has been found to yield excellent results.

For the production of chromina-alumina hydrogel beads, preparation is carried out substantially the same as that described in the above-noted Marisic patent for producing silica-alumina beads. Thus, a chromium acetate solution and a sodium aluminate solution are contacted in a mixing nozzle and discharged onto the apex of a dividing cone from which a number of small streams flow into a column of water-immiscible liquid. The temperature of said water-immiscible liquid is desirably maintained at a constant temperature by circulation through a heat exchanger outside the bead-forming tower.

The freshly formed chromia-alumina hydrogel above-described is subject to a loss of aluminum as sodium aluminate if immediately washed with water. This tends to weaken the hydrogel to such an extent that it disintegrates in the wash water. That adverse effect can be avoided by immediately treating the freshly formed hydrogel in a slightly alkaline aqueous medium. This is generally accomplished by bringing the freshly formed chromina-alumina hydrogel into contact with an aqueous solution of an ammonium salt of a mineral acid or a mineral acid or a mixture of such salt and acid. In a typical operation, the fresh hydrogel beads are sluiced out of the forming tower with oil. The hydrogel beads are then separated from the oil and treated with a 20 per cent by weight solution of ammonium sulfate. The solution is advantageously kept at a pH of 8.0 to 9.5 by the addition of sulfuric acid. It is advisable to maintain a solution of this type in contact with the freshly formed hydrogel for some time after formation. For example, the solution is recirculated through the freshly formed hydrogel or otherwise maintained in contact therewith for a period of from about 2 to about 24 hours after forming in order to fix the alumina. Such treatment of the freshly formed hydrogel is designated herein as "aging."

After the aging treatment, the chromina-alumina hydrogel is water-washed free of anions introduced during aging. Chromia-alumina hydrogel is relatively difficult to wash and hydrogel beads of such composition normally require 16 to 68 hours of water-washing. This is apparently due to the relatively high product concentration of these hydrogels. However, excessive water-washing must be avoided because of the tendency to peptization, resulting in at least partial disintegration of the hydrogel. This effect has been noted when the hydrogel is washed for more than 24 hours after the effluent wash water is free of the anion introduced during aging, i. e., free of sulfate ions when the aging treatment is effected with an aqueous ammonium sulfate solution.

The washed hydrogel can be satisfactorily dried in either superheated steam or heated air. The hydrogel so dried has been tempered for 4 hours at 1100° F. in an atmosphere of hydrogen, nitrogen, carbon dioxide, carbon monoxide, steam, and air. The use of mixtures containing oxygen results in production of a resulting gel of low mechanical strength. Of the media tested, a mixture containing oxygen is the only agent which reduces catalytic activity of the gel as measured by their capacity for dehydrogenation of naphthenes. The chromina-alumina gel should accordingly be tempered in an inert or reducing atmosphere, such as flue gas.

In accordance with the procedure of the present invention, it has been found that a marked increase in catalytic reforming activity of the chromia-alumina gel catalysts described hereinabove with an accompanying decrease in coke formation is achieved by bringing the aged chromia-alumina hydrogel into contact with an aqueous alkaline medium having a pH of 10 or above. In general, it has been found desirable to contact the aged hydrogel with an aqueous solution of at least one alkaline compound, for example, the hydroxides and carbonates of the alkali metals and alkaline earth metals, such as $LiOH$, $Li_2CO_3$, $NaOH$, $Na_2CO_3$, $KOH$, $K_2CO_3$, $Ca(OH)_2$, $Ba(OH)_2$, $BaCO_3$, $CaCO_3$, $MgCO_3$, $Mg(OH)_2$, $Sr(OH)_2$, $SrCO_3$, etc. The above list of specific compounds is not considered exhaustive nor is the use of a particular alkaline compound considered critical in producing an aqueous media of pH above 10, although dilute aqueous alkali metal hydroxide solutions and particularly KOH and NaOH are preferred. It is important for purposes of the instant invention that the chromia-alumina hydrogel, after aging in a mildly alkaline solution of pH 8.0 to 9.5, be contacted with a stronger alkaline solution characterized by a pH of at least 10 and preferably between 11 and 15. Contact of the aged hydrogel with the latter alkaline solution should, in accordance with the instant invention, be maintained for a sufficient period to effect dissolution of at least a portion of the surface alumina of the hydrogel composite. Without being limited by any theory, it appears that the fixing of the alumina during the aging treatment causes a concentration thereof on the surface of the chromia-alumina hydrogel and that the subsequent contact of the aged hydrogel, as described herein, with a strongly alkaline medium serves to remove some of the alumina which blankets the surface of the chromia-alumina catalyst, thereby improving its catalytic activity. The exact concentration of aqueous alkaline solution employed and the duration of contact between the aged hydrogel and said solution may be varied widely. As pointed out above, the concentration of alkaline compound in the treating solution is such that the pH of the resulting solution is at least 10 and preferably in the range 11 to 15. The time of contact employed will, in general, vary inversely with the concentration of the alkaline treating solution; that is, with a solution having a pH of 10, a correspondingly longer time of contact will be required than with a substantially more alkaline solution having a pH, say of 14.

As a practical matter, the time of contact between the aged hydrogel and the alkaline treating solution will generally be between about 2 and about 96 hours and more usually in the range of about 4 to about 24 hours.

Treatment of the aged hydrogel in accordance with this invention may be carried out either as a batch or continuous operation. Thus, the aged chromia-alumina hydrogel may be permitted to soak in the alkaline treating solution under substantially static conditions for the requisite time, or the aged hydrogel in the form of spheroidal globules or particles of other desired shape may be passed through a bath of the alkaline treating solution or, alternatively, the alkaline medium may be circulated through a stationary bed of the hydrogel particles. Likewise, contact between the alkaline solution and the aged hydrogel particles may be accomplished by counter-current passage thereof through an elongated treating zone. It is also within the purview of the present invention to carry out the instant treating process in the same vessel wherein the preceding aging treatment was accomplished by the addition of sufficient alkaline compound to the aging bath, at the completion of the aging treatment, to raise the pH of said bath to at least 10 and preferably higher.

After subjecting the aged chromia-alumina hydrogel to treatment with the aqueous alkaline medium as described above, the treated hydrogel is water-washed free of soluble matter as in the usual procedure set forth above and then dried and calcined as in said described procedure. While certain details referred to in the foregoing description have been directed to the formation of the hydrogel in the form of chromia-alumina gel beads, it is to be realized that treating procedure of this invention may be practiced upon chromia-alumina hydrogels of any other desired form or shape.

The following non-limiting illustrative examples will serve to more specifically point out the process of the invention and the improved results in catalytic activity and decreased coke formation obtained with the catalyst prepared in accordance with said process.

EXAMPLE 1

A chromia-alumina hydrogel was prepared from the following reactants:

Solution A.—47.5 pounds sodium aluminate made up to a volume of 10 gallons with distilled water;

Solution B.—48 pounds chromic acetate, the acetate to chromium ratio of which is adjusted within the approximate range of 2.6 to 2.8 and then made up to a volume of 13 gallons with distilled water, providing a solution containing 0.92 mole $Cr_2O_3$ per liter.

Solutions A and B were pumped separately under pressure through heating coils to an efficient mixing nozzle. The solutions were heated to about 110° F. and mixed in equal volumes at a total rate of 1200 cc. per minute. The resulting stream of hydrosol flowed over a divider into a column of D. T. E. light oil. The hydrosol set to beads of hydrogel and the resulting hydrogel beads were sluiced from the bottom of the forming tower with a 20 per cent by weight aqueous solution of ammonium sulfate. The sluicing solution was maintained at a pH of 8.5 by the addition of sulfuric acid. Since the pH of the hydrogel was about 10.5, it was necessary to add sulfuric acid to the sluicing solution in order to maintain the pH at 8.5. The bead hydrogel was aged for 24 hours in the same solution that was used to sluice from the forming tower. After aging, the gel was washed until a sulfate-free wash water was indicated. The washed hydrogel had a product concentration of 21 per cent by weight. The hydrogel was thereafter dried in 100 per cent steam at 260–270° F. for 3 to 4 hours and then tempered 4 hours at 1100° F. in a hydrogen atmosphere. The resulting beads of gel contained 21 mole per cent $Cr_2O_3$ and 79 mole per cent $Al_2O_3$. This catalyst is representative of that produced by the aforementioned process of Stover and Wilson and may be considered as a blank for comparison with the catalysts which have undergone treatment in accordance with the present process.

EXAMPLE 2

A chromia-alumina hydrogel, prepared as in Example 1, was treated, after aging, with 1.25 molar aqueous NaOH solution of pH 14.06 for 24 hours. The treated hydrogel was then water-washed until free of soluble matter, dried, and tempered in a hydrogen atmosphere.

EXAMPLE 3

A chromia-alumina hydrogel, prepared as in Example 1, was treated for 24 hours, after aging, with 1.25 molar KOH solution having an approximate pH of 14. The treated hydrogel was then water-washed until free of soluble matter, dried, and tempered in a hydrogen atmosphere.

EXAMPLE 4

This catalyst may be considered to be a "blank" catalyst and was prepared from 1400 ml. of the aged chromia-alumina hydrogel by washing the same until free of sulfate ion, drying for 6 hours at 230° F. and finishing by heating for 3 hours at 1000° F. in the presence of its evolved gases. The resultant catalyst contained 69.7 per cent $Al_2O_3$ and 30.3 per cent $Cr_2O_3$.

EXAMPLE 5

Fourteen hundred milliliters of aged chromia-alumina hydrogel identical with that employed in Example 4 were treated for 24 hours with aqueous 1.25 molar KOH solution of pH 14.06, washed free of soluble matter, dried 6 hours at 230° F. and finished by heating for 3 hours at 1000° F. in the presence of its evolved gases.

The foregoing catalysts were tested in the following reactions:

Dehydrocyclization of n-heptane

Normal heptane having a refractive index, at 25° C. of 1.3852 was employed as the charge. The catalyst in each instance was subjected to preliminary hydrogen reduction for 0.5 hour at a rate of 6.6 cc. gas/cc. catalyst/minute. The runs were made at 900° F., a liquid hourly space rate of 1, a 1-hour process period, and atmospheric pressure employing a 15 cc. catalyst charge. The product was analyzed refractometrically for toluene content. The data obtained are tabulated below:

TABLE I

| Catalyst of Example | 1 (standard) | 2 | 3 |
|---|---|---|---|
| Moles Carbon / Moles Toluene | 0.67 | 0.10 | 0.12 |
| Coke Based on Charge (Wt. Percent) | 2.9 | 0.7 | 1.0 |
| Conversion to Toluene (Mol Percent) | 37 | 47 | 59 |

From the above results, it will be noted that the catalyst of Example 2, prepared by treatment of the aged chromia-alumina hydrogel with NaOH solution gave about 30 per cent higher conversion than the standard chromia-alumina catalyst of Example 1, together with about a 60 per cent reduction in coke formation. The catalyst of Example 3, prepared by KOH treatment of the aged hydrogel, afforded even more promising results, showing a coke reduction of 65 per cent together with a 59 per cent gain in conversion as compared to the standard of Example 1.

Dehydrogenation of methylcyclohexane

Methylcyclohexane having a refractive index, at 25° C., of 1.4206 was used as the charge. All run conditions were the same as those used in dehydrocyclization of n-heptane. The results obtained are set forth below:

TABLE II

| Catalyst of Example | 4 (standard) | 5 |
|---|---|---|
| Moles Carbon / Moles Toluene | 0.11 | 0.02 |
| Coke Based on Charge (Wt. Percent) | 1.07 | 0.48 |
| Conversion to Toluene (Mol Percent) | 62.4 | 89.3 |

From the foregoing data, it will be seen that the catalyst of Example 5, prepared by treatment of the aged hydrogel with KOH solution was markedly superior to the standard chromia-alumina catalyst of Example 4. The catalyst of Example 5 formed less than half as much coke, while at the same time increasing the conversion by about 40 per cent in comparison with the standard catalyst.

Reforming naphtha

The charge used was a coastal distillate boiling in the range 300–400° F., containing 72 per cent naphthenes and having a refractive index, at 25° C., of 1.4482. The catalyst, in each instance, was subjected to a preliminary purge with nitrogen. The runs were made at 1000 F., a liquid hourly space rate of 1, a 1-hour process period, and atmospheric pressure, employing a 100 c.c. catalyst charge. The results obtained upon reforming are tabulated below:

TABLE III

| Catalyst of Example | 4 (standard) | 5 |
|---|---|---|
| Gas, liters | 38.6 | 38.5 |
| Gas gravity (air=1) | 0.24 | 0.18 |
| Gas, Wt. Percent | 14.2 | 10.5 |
| Syn. Crude, Wt. Percent | 61.9 | 62.1 |
| Coke, Wt. Percent | 17.1 | 10.5 |
| Gasoline, No loss, Wt. Percent | 68.7 | 79.0 |
| CFR-R Octane No., Micro | 94 | 95 |

It will be noted from the above table that the catalyst of Example 5 afforded a distinctly higher yield of gasoline and gave about 40 per cent less coke than the standard chromia-alumina catalyst of Example 4.

I claim:

1. In the production of a chromia-alumina catalyst prepared by mixing aqueous solutions of sodium aluminate and chromium acetate to yield a hydrosol having a chromina-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromina-alumina catalytic composite, the improvement which comprises bringing the hydrogel, after the aforementioned aging, into contact with an aqueous alkaline solution characterized by a pH above 10 for a period of time sufficient to effect dissolution of at least a portion of the surface alumina of said aged hydrogel.

2. In the production of a chromina-alumina catalyst prepared by mixing aqueous solutions of sodium aluminate and chromium acetate to yield a hydrosol having a chromia-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromina-alumina catalytic composite, the improvement which comprises bringing the hydrogel, after the aforementioned aging, into contact with an aqueous alkaline solution characterized by a pH in the range of 11 to 15 for a period of time sufficient to effect dissolution of at least a portion of the surface alumina of said aged hydrogel.

3. In the production of a chromia-alumina catalyst prepared by mixing aqueous solutions of sodium aluminate and chromium acetate to yield a hydrosol having a chromia-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromia-alumina catalytic composite, the improvement which comprises contacting the hydrogel, after the aforementioned aging, with an aqueous alkaline medium having a pH above 10 for a period of between about 2 and about 96 hours.

4. In the production of a chromia-alumina catalyst prepared by mixing aqueous solutions of sodium aluminate and chromium acetate to yield a hydrosol having a chromia-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromia-alumina catalytic composite, the improvement which comprises contacting the hydrogel, after the aforementioned aging, with an aqueous alkaline medium having a pH in the range of 11 to 15 for a period of between about 4 and about 24 hours.

5. In the production of a chromia-alumina catalyst prepared by mixing aqueous solutions of sodium aluminate and chromium acetate to yield a hydrosol having a chromia-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromia-alumina catalytic composite, the improvement which comprises contacting the hydrogel, after the aforementioned aging, with an aqueous solution of an alkali metal hydroxide having a pH above 10 for a period of time sufficient to effect dissolution of at least a portion of the surface alumina of said aged hydrogel.

6. In the production of a chromia-alumina catalyst prepared by mixing aqueous solutions of sodium aluminate and chromium acetate to yield a hydrosol having a chromia-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromia-alumina catalytic composite, the improvement which comprises contacting the hydrogel, after the aforementioned aging, with an aqueous solution of potassium hydroxide having a pH above 10 for a period of between about 2 and about 96 hours.

7. In the production of a chromia-alumina catalyst prepared by mixing aqueous solutions of sodium aluminate and chromium acetate to yield a hydrosol having a chromia-alumina content of at least about 10 per cent by weight, controlling the sodium to aluminum ion ratio and the acetate to chromium ion ratio in said solutions to effect rapid gelation of said hydrosol to a hydrogel, aging the hydrogel, so obtained, in a mildly alkaline aqueous medium having a pH between 8.0 and 9.5, washing the aged hydrogel, drying and calcining the same to afford a resulting hard chromia-alumina catalytic composite, the improvement which comprises contacting the hydrogel, after the aforementioned aging, with an aqueous solution of sodium hydroxide having a pH above 10 for a period of between about 2 and about 96 hours.

ROBERT L. SMITH.

References Cited in the file of this patent

UNITED STATES PATENTS

| Number | Name | Date |
|---|---|---|
| 2,323,868 | Hughes | July 6, 1943 |
| 2,435,379 | Archibald | Feb. 3, 1948 |
| 2,442,884 | Webb et al. | June 8, 1948 |
| 2,453,084 | Brown | Nov. 2, 1948 |
| 2,464,329 | Marisic et al. | Mar. 15, 1949 |